US006950886B1

(12) United States Patent
Bailey

(10) Patent No.: US 6,950,886 B1
(45) Date of Patent: Sep. 27, 2005

(54) METHOD AND APPARATUS FOR REORDERING TRANSACTIONS IN A PACKET-BASED FABRIC USING I/O STREAMS

(75) Inventor: Joseph A. Bailey, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 520 days.

(21) Appl. No.: 09/755,499

(22) Filed: Jan. 4, 2001

(51) Int. Cl.$^7$ .......................... G06F 3/00; G06F 15/16; H04L 12/56
(52) U.S. Cl. ......................... 710/52; 710/54; 709/232; 370/389
(58) Field of Search .......................... 710/52–56, 305, 710/313; 370/389, 392, 394, 218, 289, 292, 370/294, 359–360, 428, 429, 300, 351–357; 709/231–232

(56) References Cited

U.S. PATENT DOCUMENTS

| 4,677,612 | A | * | 6/1987 | Olson et al. ................. 370/445 |
| 5,333,267 | A | * | 7/1994 | Sweazey ....................... 709/251 |
| 5,875,176 | A | * | 2/1999 | Sherer et al. ................ 370/230 |
| 6,011,798 | A | * | 1/2000 | McAlpine .............. 370/395.42 |
| 6,092,137 | A | * | 7/2000 | Huang et al. ............... 710/111 |
| 6,108,345 | A | * | 8/2000 | Zhang ......................... 370/445 |
| 6,170,025 | B1 | * | 1/2001 | Drottar et al. ................. 710/48 |
| 6,205,150 | B1 | * | 3/2001 | Ruszczyk .................... 370/412 |
| 6,263,371 | B1 | * | 7/2001 | Geagan et al. .............. 709/231 |
| 6,269,330 | B1 | * | 7/2001 | Cidon et al. ................... 714/43 |
| 6,343,067 | B1 | * | 1/2002 | Drottar et al. .............. 370/231 |
| 6,584,102 | B1 | * | 6/2003 | Lu .............................. 370/389 |

FOREIGN PATENT DOCUMENTS

| JP | 10341240 A | * | 12/1998 | ........... H04L 12/28 |
| WO | WO 009825381 A1 | * | 11/1998 | ........... H04L 12/56 |
| WO | WO 200077999 A2 | * | 12/2000 | ........... H04L 29/00 |

OTHER PUBLICATIONS

Free On-Line Dictionary of Computing, [entry: 'first-in first-out']. Online Dec. 6, 1999. Retrieved Feb. 19, 2004. <http://foldoc.doc.ic.ac.uk/foldoc.cgi?first-in+first-out>.*
"The HyperTransport™ Technology (HT) I/O Bus Architecture," API Networks, Inc., HyperTransport™ Technology Architecture White Paper, Revision #1002, Jun. 15, 2001.
"HyperTransport™ Technology I/O Link, A High-Bandwidth I/O Architecture," Advanced Micro Devices, #25012A, Jul. 20, 2001.

* cited by examiner

Primary Examiner—Mark H. Rinehart
Assistant Examiner—Thomas J. Cleary
(74) Attorney, Agent, or Firm—Meyertons Hood Kivlin Kowert & Goetzel, P.C.; B. Noël Kivlin

(57) ABSTRACT

A method and apparatus for reordering transactions in a packet-based fabric using I/O Streams. Packet bus transactions may flow upstream from node to node on a non-coherent I/O packet bus. Some peripheral buses place ordering constraints on their bus transactions to prevent deadlock situations. When a packet transaction originating on a peripheral bus with ordering constraints is translated to a packet bus such as the non-coherent I/O packet bus, those same ordering constraints may be mapped over to the packet bus transactions. To efficiently handle the packets and prevent deadlock situations, packets may be handled and reordered on an I/O stream basis. Thus, reordering logic may consider I/O streams independently and therefore only reorder transactions within an I/O stream and not across more than one I/O stream.

21 Claims, 3 Drawing Sheets

METHOD AND APPARATUS FOR REORDERING TRANSACTIONS IN A PACKET-BASED FABRIC USING I/O STREAMS

BACKGROUND OF THE INVENTION

1. Field of the Invention

This invention relates to computer system input/output (I/O) and, more particularly, to packet transaction handling in an I/O link.

2. Description of the Related Art

In a typical computer system, one or more processors may communicate with input/output (I/O) devices over one or more buses. The I/O devices may be coupled to the processors through an I/O bridge which manages the transfer of information between a peripheral bus connected to the I/O devices and a shared bus connected to the processors. Additionally, the I/O bridge may manage the transfer of information between a system memory and the I/O devices or the system memory and the processors.

Unfortunately, many bus systems suffer from several drawbacks. For example, multiple devices attached to a bus may present a relatively large electrical capacitance to devices driving signals on the bus. In addition, the multiple attach points on a shared bus produce signal reflections at high signal frequencies which reduce signal integrity. As a result, signal frequencies on the bus are generally kept relatively low in order to maintain signal integrity at an acceptable level. The relatively low signal frequencies reduce signal bandwidth, limiting the performance of devices attached to the bus.

Lack of scalability to larger numbers of devices is another disadvantage of shared bus systems. The available bandwidth of a shared bus is substantially fixed (and may decrease if adding additional devices causes a reduction in signal frequencies upon the bus). Once the bandwidth requirements of the devices attached to the bus (either directly or indirectly) exceeds the available bandwidth of the bus, devices will frequently be stalled when attempting access to the bus, and overall performance of the computer system including the shared bus will most likely be reduced. An example of a shared bus used by I/O devices is a peripheral component interconnect (PCI) bus.

Many I/O bridging devices use a buffering mechanism to buffer a number of pending transactions from the PCI bus to a final destination bus. However buffering may introduce stalls on the PCI bus. Stalls may be caused when a series of transactions are buffered in a queue and awaiting transmission to a destination bus and a stall occurs on the destination bus, which stops forward progress. Then a transaction that will allow those waiting transactions to complete arrives at the queue and is stored behind the other transactions. To break the stall, the transactions in the queue must somehow be reordered to allow the newly arrived transaction to be transmitted ahead of the pending transactions. Thus, to prevent scenarios such as this, the PCI bus specification prescribes a set of reordering rules that govern the handling and ordering of PCI bus transactions.

To overcome some of the drawbacks of a shared bus, some computers systems may use packet-based communications between devices or nodes. In such systems, nodes may communicate with each other by exchanging packets of information. In general, a "node" is a device which is capable of participating in transactions upon an interconnect. For example, the interconnect may be packet-based, and the node may be configured to receive and transmit packets. Generally speaking, a "packet" is a communication between two nodes: an initiating or "source" node which transmits the packet and a destination or "target" node which receives the packet. When a packet reaches the target node, the target node accepts the information conveyed by the packet and processes the information internally. A node located on a communication path between the source and target nodes may relay the packet from the source node to the target node.

Additionally, there are systems that use a combination of packet-based communications and bus-based communications. For example, as shown in FIG. 1, a block diagram of a computer system has several PCI devices connected to a PCI bus. The PCI bus is connected to a packet bus interface that may then translate bus transactions into packet transactions for transmission on a packet bus. The interface between the two buses may also transmit the packets upstream to an I/O bridge as described above.

However, since PCI devices initiated the transactions, the packet-based transactions may be constrained by the same ordering rules as set forth in the PCI Local Bus specification. The same may be true for packet transactions destined for the PCI bus. These ordering rules are still observed in the packet-based transactions since transaction stalls that may occur at a packet bus interface may cause a deadlock at that packet bus interface. This deadlock may cause further stalls back into the packet bus fabric.

SUMMARY OF THE INVENTION

Various embodiments of a method and apparatus for reordering transactions in a packet-based I/O stream are disclosed. In one embodiment, packet bus transactions may flow upstream from node to node on a non-coherent I/O packet bus. Some peripheral buses place ordering constraints on their bus transactions to prevent deadlock situations. When a packet transaction originating on a peripheral bus with ordering constraints is translated to a packet bus such as the non-coherent I/O packet bus, those same ordering constraints may be mapped over to the packet bus transactions. To efficiently handle the packets and prevent deadlock situations, packets may be handled and reordered on an I/O stream basis. Thus, reordering logic may consider I/O streams independently and therefore only reorder transactions within an I/O stream and not across more than one I/O stream.

In one embodiment, an apparatus is contemplated which includes a plurality of upstream buffers each configured to store a plurality of upstream packets. Each of the plurality of upstream packets contains an associated identifier. The apparatus may also include a router that is coupled to each of the plurality of upstream buffers and is configured to receive the plurality of packets. The router is also configured to route each of the plurality of packets to a given one of the upstream buffers, depending upon the associated identifier.

In one particular implementation, the apparatus includes a plurality of upstream reorder logic circuits. Each one of the plurality of upstream reorder logic circuits is coupled to a corresponding one of the plurality of upstream buffers and is configured to determine an order of transmitting each of the packets stored in the corresponding one of the plurality of upstream buffers based on a set of predetermined criteria. The router is also configured to route upstream packets having associated identifiers with corresponding values to the same upstream buffer of said plurality of upstream buffers.

In addition, the apparatus includes a downstream buffer and a downstream reorder logic circuit. The downstream buffer may be configured to store a plurality of downstream packets. Each one of the plurality of downstream packets contains an identifier with a corresponding value. The downstream reorder logic circuit is coupled to the downstream buffer and is configured to determine an order of transmitting each of the plurality of downstream packets based on said set of predetermined criteria. The predetermined criteria may include arrival times and transaction types of each of the plurality of upstream packets and each of the plurality of downstream packets.

Figure 1:
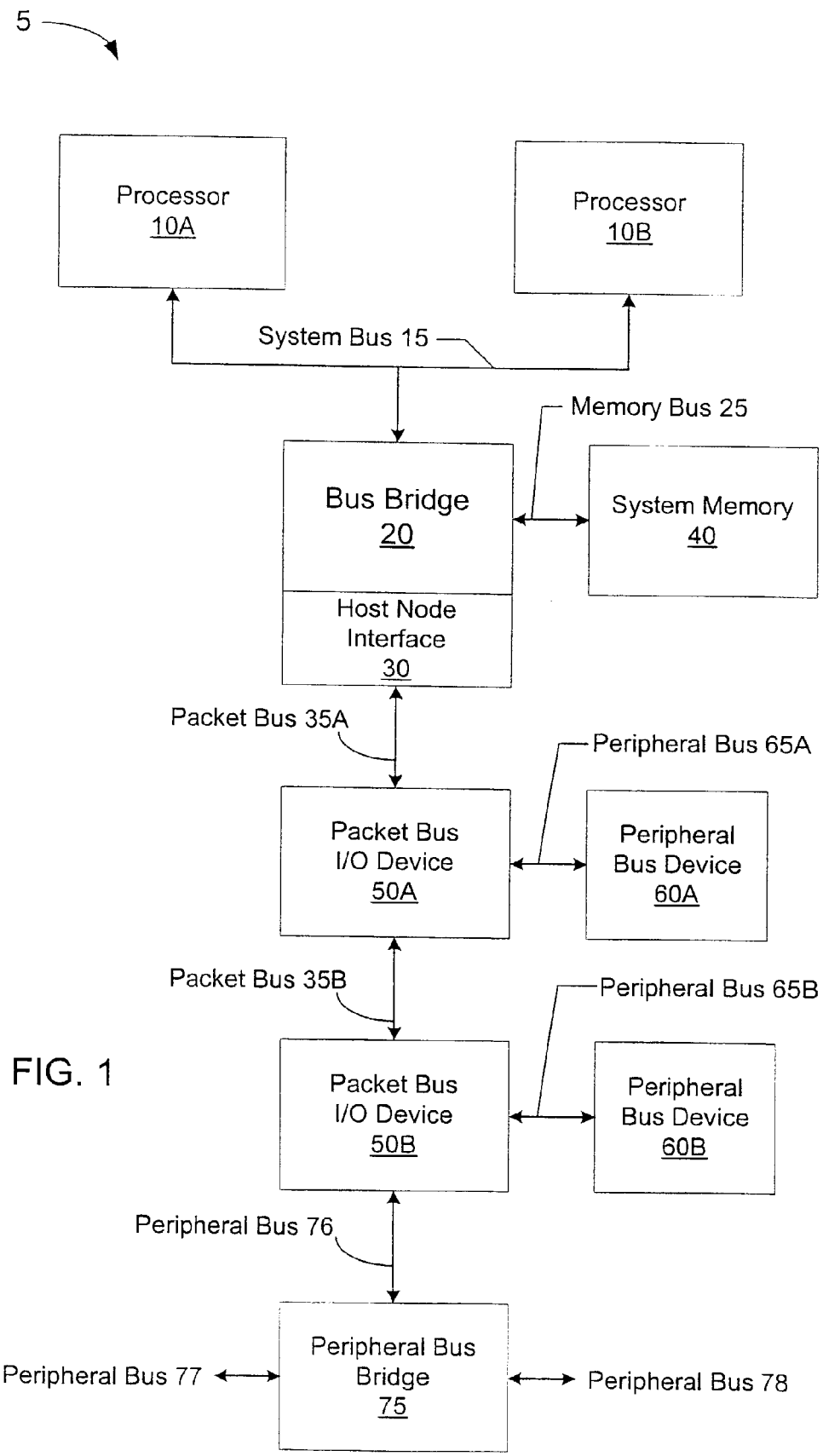
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to FIG. 1, a block diagram of one embodiment of a computer system 5 is shown. Computer system 5 includes a processor 10A and a processor 10B. Processor 10A and 10B are coupled to a bus bridge 20 by a system bus 15. A system memory 40 is coupled to bus bridge 20 by a memory bus 25. Bus bridge 20 is coupled to various peripheral devices such as peripheral device 60A and 60B via packet input/output (I/O) devices 50A and 50B and packet buses 35A and 35B, respectively. Additional peripheral devices (not shown) may be coupled to computer system 5 through peripheral bus bridge 75 via additional peripheral buses 76, 77 and 78.

Processor 10A and 10B are each illustrative of, for example, an x86 microprocessor such as a Pentium™ or Athlon™ microprocessor. In addition, one example of a packet bus such as packet bus 35 may be a non-coherent Lightning Data Transport™ (ncLDT). It is understood, however, that other types of microprocessors and other types of packet buses may be used. Peripheral bus 65 is illustrative of a common peripheral bus such as a PCI bus.

Bus bridge 20 includes a host node interface 30 that may receive upstream packet transactions from downstream nodes such as packet I/O bus device 50A and 50B. Alternatively, host node interface 30 may transmit packets downstream to devices downstream such as peripheral bus device 60A.

During operation, packet I/O bus device 50A and 50B may translate PCI bus transactions into upstream packet transactions that travel in I/O streams and additionally may translate downstream packet transactions into PCI bus transactions. All packets originating at nodes other than host node interface 30 may flow upstream to host node interface 30. All packets originating at host node interface 30 may flow downstream to other nodes such as packet I/O bus device 50A and 50B. As used herein, "upstream" refers to packet traffic flow in the direction of host node interface 30 and "downstream" refers to packet traffic flow in the direction away from host node interface 30. Each I/O stream may be identified by an identifier called a Unit ID. It is contemplated that the Unit ID may be part of a packet header or it may be some other designated number of bits in a packet or packets. As used herein, "I/O stream" refers to all packet transactions that contain the same Unit ID and therefore originate from the same node.

To illustrate, peripheral device 60B initiates a transaction directed to peripheral device 60A. The transaction may first be translated into one or more packets with a unique Unit ID and then transmitted upstream. Each packet may be assigned a Unit ID that identifies the originating node. Since packet bus I/O device 50A may not forward packets to peripheral device 60A from downstream, the packets are transmitted upstream to host node interface 30. Host node interface 30 may then transmit the packets back downstream with a Unit ID of host node interface 30 until packet bus I/O device 50A recognizes and claims the packet for a peripheral device on the peripheral bus connected to it. Packet bus I/O device 50A may then translate the packets into peripheral bus transactions and transmit the transactions to peripheral device 60A.

As described above, the peripheral bus transactions may be constrained by a set of ordering rules, particularly in the case of a PCI bus. Thus the packets, once translated, may still be bound to those same ordering rules. As will be described in greater detail below, a transaction-reordering scheme is described that uses the concept of reordering a transaction only within an I/O stream.

Figure 2:
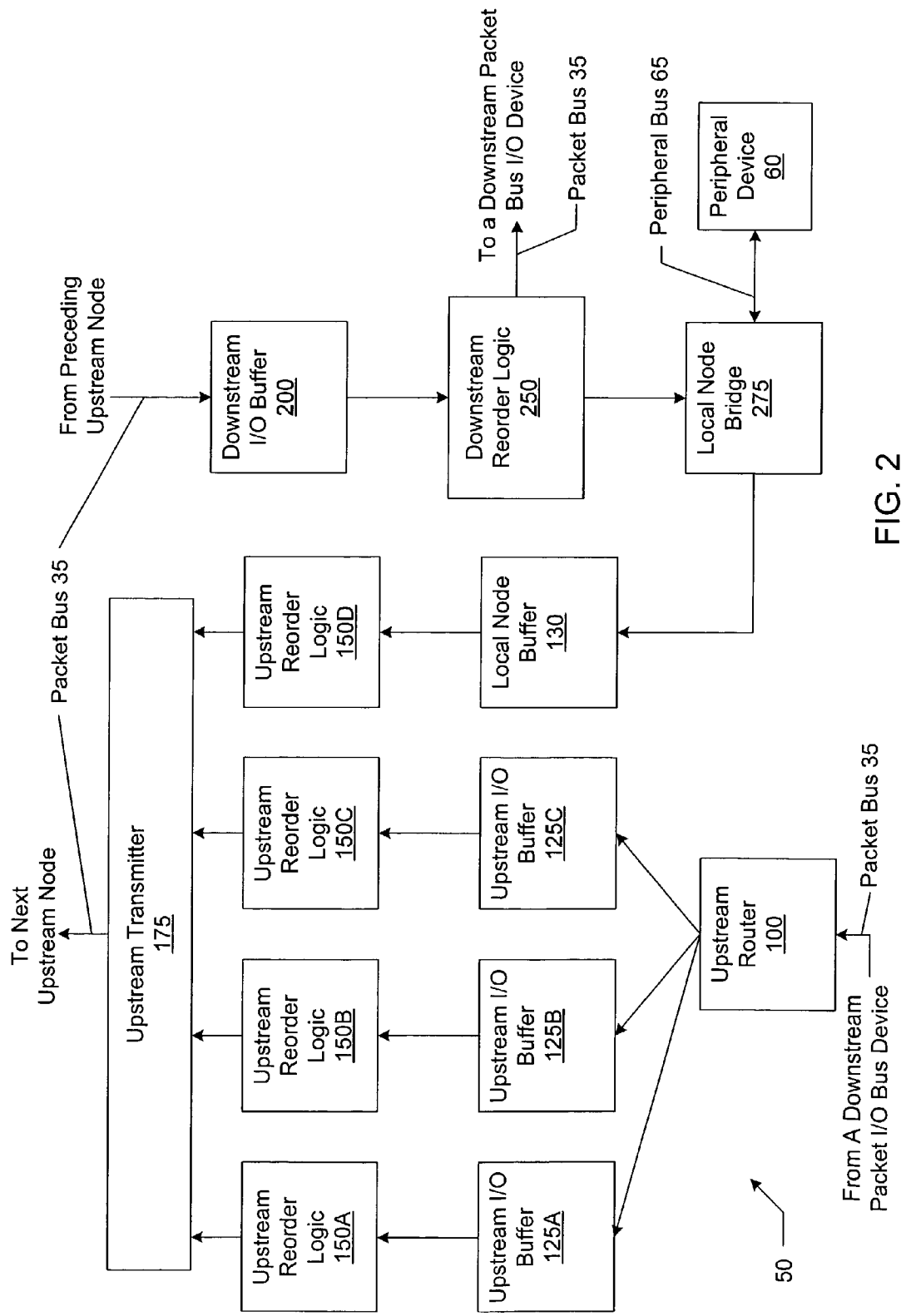
FIG. 2 is a block diagram of one embodiment of a packet I/O bus device.

Referring now to FIG. 2, a block diagram of one embodiment of a packet bus I/O device 50 is shown. Circuit components that correspond to those shown in FIG. 1 are numbered identically for simplicity and clarity. Packet bus I/O device 50 is illustrative of packet bus I/O device 50A and 50B of FIG. 1. In FIG. 2, packet bus I/O device 50 includes an upstream router 100 that is coupled to one or more upstream I/O buffers 125A–C. Additionally, packet bus I/O device 50 includes a local node buffer 130 coupled to a reordering logic circuit 150D. Upstream I/O buffers 125A–C are coupled to one or more corresponding upstream reordering logic circuits 150A–C. Upstream reorder logic circuits 150A–C are coupled to an upstream transmitter 175. Upstream transmitter 175 is coupled to a the next upstream node which may be another packet bus I/O device or it may be host node interface 30 of FIG. 1 through packet bus 35. Downstream buffer 200 of FIG. 2 is coupled to a downstream reorder logic circuit 250. Downstream buffer 200 may also receive packets from host node interface 30 or a preceding upstream node through packet bus 35. A local node bridge 275 is coupled to downstream reorder logic circuit 250 and to local node buffer 130. Peripheral device 60 is coupled to local node bridge 275 via peripheral bus 65. Local node bridge 275 may also be coupled to additional downstream packet bus I/O devices through packet bus 35.

As described above in FIG. 1, upstream packets flow from one packet bus I/O device to the next until the packet reaches host node interface 30. Thus, depending on the number and type of downstream nodes, a corresponding number of upstream I/O buffers may be necessary to route each I/O stream. For example, peripheral bus bridge 75 may have three peripheral buses 76,77 and 78 connected to it. Thus, peripheral bus bridge may initiate three different 110 streams and therefore, packets having three different Unit IDs may be transmitted upstream. To accommodate the three I/O streams, packet bus 110 device 50B may have three upstream I/O buffers such as upstream I/O buffers 125A–C of FIG. 2, and three upstream reorder logic circuits 150A–C. In addition, local PCI bus transactions that are not claimed by peripheral devices on the local PCI bus may cause local node bridge 275 to initiate packet transactions containing another Unit ID and thus an additional I/O stream to be merged into the upstream flow. Thus a fourth buffer, local node buffer 130 may be used to handle the local I/O stream. Therefore, each next upstream packet bus I/O device such as packet bus I/O device 50A may require one additional buffer similar to local node buffer 130. Thus, the farther up the I/O chain a packet bus I/O device is located, the more buffers may be required since there may be more I/O streams to process. It is contemplated that in other embodiments more or less I/O streams may be used and correspondingly more or less I/O buffers and reorder logic circuits may be used.

During operation, a packet transaction may enter upstream router 100. Upstream router 100 may identify the packet by the packet's Unit ID, which may be a five-bit identifier field. Upstream router 100 may assign this packet and all other packets with this same Unit ID to the first available buffer, such as upstream I/O buffer 125A. As each succeeding packet enters upstream router 100 it is examined and assigned to an appropriate buffer. Hence, all packets with the same Unit ID may be stored in the same buffer. Each upstream reorder logic circuit 150A–D may then analyze only those packets contained in the particular buffer that each receives packets from. For example, in the illustrated embodiment, upstream reorder logic circuit 150C analyzes transactions only in upstream I/O buffer 125C. The above configuration is in contrast to some other reorder logic circuits. Some buffering mechanisms may use virtual channels to segregate packet transactions, where the virtual channels may correspond to PCI mapped transactions. In these virtual channel mechanisms, the reorder logic circuits may be configured to analyze transactions that are stored across all the virtual channel buffers.

Upstream reorder logic circuits 150A–D may examine the type of transactions present in corresponding upstream I/O buffers 125A–C and local node buffer 130 and to reorder the transactions as specified in the PCI specification. For each PCI transaction type there is a corresponding ncLDT mapped transaction. In this way, the reordering rules may be preserved once the PCI transactions are translated into packets. A more detailed description of the ncLDT may be found in the LDT Specification available from Advanced Micro Devices.

Since all downstream packets may contain the Unit ID of host node 30 of FIG. 1, downstream transactions may enter downstream I/O buffer 200 of FIG. 2 without a downstream router. Downstream reorder logic 250 may examine the type of transactions present in downstream I/O buffer 200 and to reorder the transactions as specified in the PCI specification.

Figure 3A:
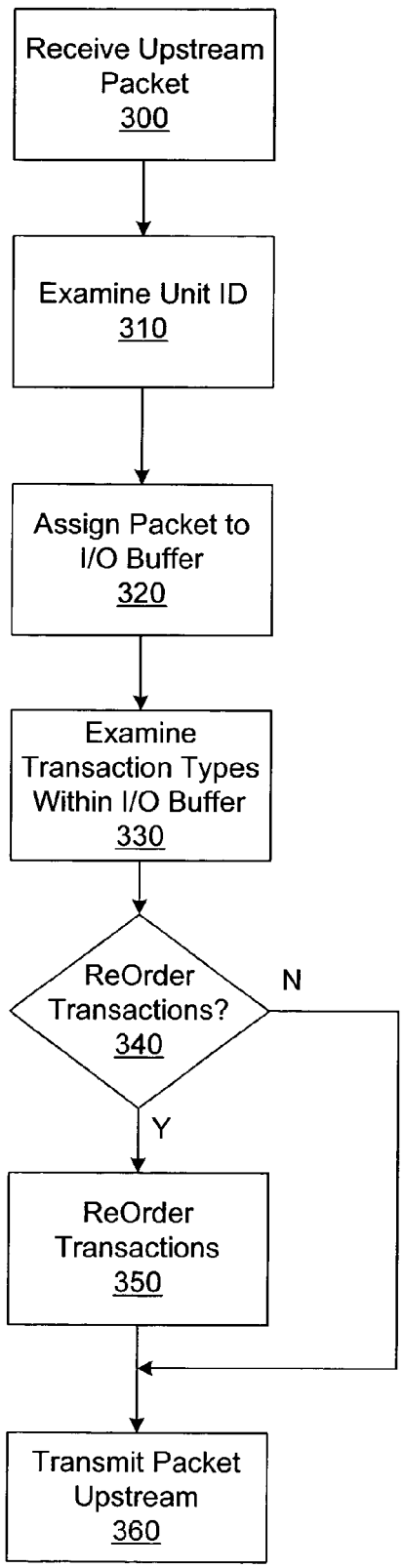
FIG. 3A is a flow diagram of the handling of an upstream packet by one embodiment of a packet bus I/O device.

Turning to FIG. 3A, a flow diagram of the handling of an upstream packet by one embodiment of a packet bus I/O device is shown. It is noted that other embodiments are contemplated. Referring collectively to FIGS. 2 and 3A the operation of packet bus I/O device 50 of FIG. 2 is described. It is noted that for clarity, upstream I/O buffers 125A–C are referred to as upstream I/O buffer 125 and upstream reorder logic circuits 150A–D are referred to as upstream reorder logic circuit 150. Operation begins in step 300 of FIG. 3A.

Beginning in step 300, a packet is received by packet bus I/O device 50 of FIG. 2 from a downstream node. Proceeding to step 310 of FIG. 3A, upstream router 100 of FIG. 2 examines the Unit ID of the packet. In step 320, if the packet is the first packet, upstream router 100 assigns the packet to a first available upstream I/O buffer 125. If the packet is not the first packet, upstream router 100 assigns the packet to the upstream I/O buffer 125 that contains other packets with the same Unit ID. In this way, each upstream I/O buffer 125 may contain only packets with the same Unit ID. Proceeding to step 330 of FIG. 3A, each upstream reorder logic circuit 150 examines only the packets stored in the upstream I/O buffer 125 connected to it. Proceeding to step 340 of FIG. 3A, each upstream reorder logic circuit 150 of FIG. 2 examines the type of transaction that each packet contains and may reorder the packets based on a set of transaction reordering rules. If upstream reorder logic circuit 150 determines that reordering is necessary, operation proceeds to step 350 of FIG. 3A where upstream reorder logic circuit 150 of FIG. 2 reorders the transactions in upstream I/O buffer 125. Proceeding to step 360 of FIG. 3A, upstream transmitter 175 of FIG. 2 may then transmit each packet upstream. Upstream transmitter 175 may transmit the packets from each upstream I/O buffer 125 based on a first come first served ordering scheme. Referring back to step 340 of FIG. 3A, if reordering of transactions is not necessary, then operation proceeds to step 360 where upstream transmitter 175 of FIG. 2 may then transmit each packet upstream.

Figure 3B:
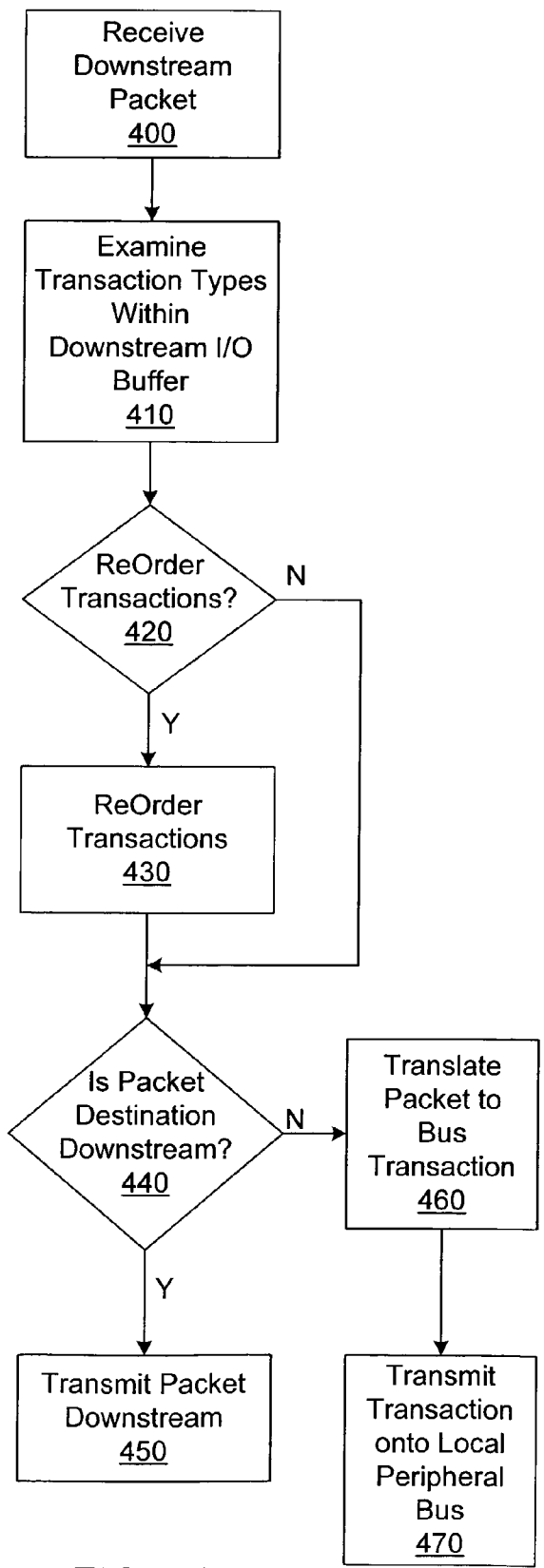
FIG. 3B is a flow diagram of the handling of a downstream packet by one embodiment of a packet bus I/O device.

Referring to FIG. 3B, a flow diagram of the handling of a downstream packet by one embodiment of a packet bus I/O device is shown. It is noted that other embodiments are contemplated. Referring collectively to FIGS. 2 and 3B the operation of packet bus I/O device 50 of FIG. 2 is described. Beginning in step 400, a packet is received by packet bus I/O device 50 of FIG. 2 from an upstream node and stored in downstream I/O buffer 200. Proceeding to step 410 of FIG. 3B, downstream reorder logic circuit 250 of FIG. 2 examines the packets stored in the downstream I/O buffer 200. Downstream reorder logic circuit 250 of FIG. 2 examines the type of transaction that each packet contains and may reorder the packets based on a set of transaction reordering rules. In step 420, if downstream reorder logic circuit 250 determines that reordering is necessary, operation proceeds to step 430 of FIG. 3B where downstream reorder logic circuit 250 of FIG. 2 reorders the transactions in downstream I/O buffer 200 and operation proceeds to step 440 of FIG. 3B. Referring back to step 420, if downstream reorder logic circuit 250 of FIG. 2 determines that reordering is not necessary, operation proceeds to step 440 of FIG. 3B. Proceeding to step 440 of FIG. 3B, downstream reorder logic circuit 250 of FIG. 2 determines whether the destination of the transaction is on the local PCI bus connected to packet bus I/O device 50. If the destination of the transaction is not on the local PCI bus, then operation proceeds to step 450 of FIG. 3B where downstream reorder logic circuit 250 of FIG. 2 transmits the packet to the next downstream node. Referring back to step 440 of FIG. 3B, if the destination of the transaction is on the local PCI bus, then downstream reorder logic circuit 250 of FIG. 2 forwards the packet to local node bridge 275 and operation proceeds to step 460 of FIG. 3B. In step 460, local node bridge 275 of FIG. 2 may then translate the packet into a bus transaction. Operation proceeds to step 470 of FIG. 3B where local node bridge 275 of FIG. 2 may then place the transaction on peripheral bus 65 where a peripheral device 60 may claim the transaction.

Numerous variations and modifications will become apparent to those skilled in the art once the above disclosure is fully appreciated. It is intended that the following claims be interpreted to embrace all such variations and modifications.

What is claimed is:

1. An apparatus comprising:
   a plurality of upstream buffers each configured to store a plurality of upstream packets, wherein each of said plurality of upstream packets contains an associated identifier indicative of a source of each of said plurality of upstream packets; and
   a router coupled to each of said plurality of upstream buffers and configured to receive said plurality of packets, and to route each of said plurality of packets to a given one of said upstream buffers, depending upon the associated identifier, wherein a given buffer of said plurality of upstream buffers stores only packets having a same source;
   a plurality of upstream reorder logic circuits, wherein each one of said plurality of upstream reorder logic circuits is coupled to a corresponding one of said plurality of upstream buffers and is configured to determine a correct order of transmitting each of said packets stored in said corresponding one of said plurality of upstream buffers based on a set of predetermined criteria, wherein each of said plurality of upstream reorder logic circuits is further configured to reorder given ones of said packets stored in said corresponding one of said plurality of upstream buffers in response to determining that said order of transmitting is not correct;
   a transmitter unit coupled to said plurality of upstream reorder logic circuits and configured to transmit one packet of said plurality of upstream packets stored within said plurality of upstream buffers dependent upon an order of receipt within said plurality of upstream buffers.

2. The apparatus as recited in claim 1 further comprises:
   a downstream buffer configured to store a plurality of downstream packets, wherein each of said plurality of downstream packets contains an identifier with a corresponding value;
   a downstream reorder logic circuit coupled to said downstream buffer and configured to determine an order of transmitting each of said plurality of downstream packets based on said set of predetermined criteria.

3. The apparatus as recited in claim 2, wherein said predetermined criteria include:
   arrival times of each of said plurality of upstream packets and each of said plurality of downstream packets;
   transaction types of each of said plurality of upstream packets and each of said plurality of downstream packets.

4. The apparatus as recited in claim 1 further comprising a local node bridge circuit configured to translate a peripheral bus transaction into an additional upstream packet and to forward said additional upstream packet upstream.

5. The apparatus as recited in claim 4 further comprising a dedicated node stream buffer coupled to said local node bridge circuit and configured to store said additional upstream packet.

6. The apparatus as recited in claim 1, wherein said router is further configured to route upstream packets having associated identifiers with corresponding values to the same upstream buffer of said plurality of upstream buffers.

7. The apparatus as recited in claim 1, wherein said router is further configured to route upstream packets having associated identifiers with different values to different upstream buffers of said plurality of upstream buffers.

8. A system comprising:
   a processor;
   a bus bridge coupled to said processor; and
   a packet bus device coupled to said bus bridge by a packet bus, wherein said packet bus device includes an apparatus comprising:
      a plurality of upstream buffers each configured to store a plurality of upstream packets, wherein each of said plurality of upstream packets contains an associated identifier indicative of a source of each of said plurality of upstream packets; and
      a router coupled to each of said plurality of upstream buffers and configured to receive said plurality of packets, and to route each of said plurality of packets to a given one of said upstream buffers, depending upon the associated identifier, wherein a given buffer of said plurality of upstream buffers stores only packets having a same source;
      a plurality of upstream reorder logic circuits, wherein each one of said plurality of upstream reorder logic circuits is coupled to a corresponding one of said plurality of upstream buffers and is configured to determine a correct order of transmitting each of said packets stored in said corresponding one of said plurality of upstream buffers based on a set of predetermined criteria, wherein each of said plurality of upstream reorder logic circuits is further configured to reorder given ones of said packets stored in said corresponding one of said plurality of upstream buffers in response to determining that said order of transmitting is not correct;
      a transmitter unit coupled to said plurality of upstream reorder logic circuits and configured to transmit one packet of said plurality of upstream packets stored within said plurality of upstream buffers dependent upon an order of receipt within said plurality of upstream buffers.

9. The system as recited in claim 8, wherein said apparatus further comprising:
   a downstream buffer configured to store a plurality of downstream packets, wherein each of said plurality of downstream packets contains an identifier with a corresponding value;
   a downstream reorder logic circuit coupled to said downstream buffer and configured to determine an order of transmitting each of said plurality of downstream packets based on said set of predetermined criteria.

10. The system as recited in claim 9, wherein said predetermined criteria include:
    arrival times of each of said plurality of upstream packets and each of said plurality of downstream packets;
    transaction types of each of said plurality of upstream packets and each of said plurality of downstream packets.

11. The system as recited in claim 8 further comprising a local node bridge circuit configured to translate a peripheral bus transaction into an additional upstream packet and to forward said additional upstream packet upstream.

12. The system as recited in claim 11 further comprising a dedicated node stream buffer coupled to said local node bridge circuit and configured to store said additional upstream packet.

13. The system as recited in claim 8, wherein said router is further configured to route upstream packets having associated identifiers with corresponding values to the same upstream buffer of said plurality of upstream buffers.

14. The system as recited in claim 8, wherein said router is further configured to route upstream packets having associated identifiers with different values to different upstream buffers of said plurality of upstream buffers.

15. A method comprising:
   receiving a plurality of upstream packets, wherein each one of said plurality of upstream packets contains an associated identifier indicative of a source of each of said plurality of upstream packets;
   examining each of said associated identifiers;
   routing each packet of said plurality of packets to a given upstream buffer of a plurality of upstream buffers, depending upon the associated identifier;
   storing only packets having a same associated identifier within a given buffer of said plurality of upstream buffers;
   determining a correct order of transmitting each of said packets stored in each of said plurality of upstream buffers based on a set of predetermined criteria;
   reordering given ones of said packets stored in said corresponding one of said plurality of upstream buffers in response to determining that said order of transmitting is not correct; and
   transmitting one packet of said plurality of upstream packets stored within said plurality of upstream buffers dependent upon an order of receipt within said plurality of upstream buffers.

16. The method as recited in claim 15 further comprising:
   storing a plurality of downstream packets in a downstream buffer, wherein each of said plurality of downstream packets contains an identifier with a corresponding value;
   determining an order of transmitting each of said plurality of downstream packets based on said set of predetermined criteria.

17. The method as recited in claim 16, wherein said predetermined criteria include:
   arrival times of each of said plurality of upstream packets and each of said plurality of downstream packets;
   transaction types of each of said plurality of upstream packets and each of said plurality of downstream packets.

18. The method as recited in claim 15 further comprising translating a peripheral bus transaction into an additional upstream packet and forwarding said additional upstream packet upstream.

19. The method as recited in claim 18 further comprising storing said additional upstream packet in a dedicated node stream buffer.

20. The method as recited in claim 15 further comprising routing upstream packets having associated identifiers with corresponding values to the same upstream buffer of said plurality of upstream buffers.

21. The method as recited in claim 15 further comprising routing upstream packets having associated identifiers with different values to different upstream buffers of said plurality of upstream buffers.

* * * * *